United States Patent Office 3,549,656

Patented Dec. 22, 1970

3,549,656

ANTIDEPRESSANT 1 - AMINOALKYL - THIOPHTHALANES AND ACID ADDITION SALTS THEREOF

Povl Viggo Petersen, Virum, Niels Lassen, Gentofte, and Thorkil Ammitzboll, Greve Strand, Denmark, assignors to Kefalas A/S Copenhagen-Valby, Denmark No Drawing. Filed Dec. 28, 1967, Ser. No. 694,070
Int. Cl. A61k *27/00;* C07d *63/22*
U.S. Cl. 260—330.5 14 Claims

ABSTRACT OF THE DISCLOSURE 1-aminoalkyl-thiophthalanes, acid addition salts thereof, methods of making and using them, and compositions thereof. The compounds are useful as thymoleptics having improved lipoid solubility and effectiveness.

The present invention relates to novel compounds of the following general formula:

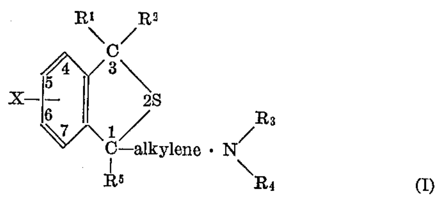

(I)

wherein $R^1$ and $R^2$ each represents hydrogen or a lower-alkyl group, $R^3$ and $R^4$ each represents hydrogen, a lower-alkyl group, a benzyl group, or $R^3$ and $R^4$ taken together with the nitrogen atom represent the radical of a heterocyclic amine having a saturated five-membered or six-membered ring, "alkylene" represents a straight or branched alkylene chain with from two to six carbon atoms, at least two carbon atoms being in the chain directly connecting the ring carbon atom with the nitrogen atom, X represents hydrogen, halogen, a lower-alkyl group, a lower-alkyloxy group or a trihalomethyl group, and $R^5$ represents —CO·NHR$^6$, —COOR$^7$, —CO·R$^8$, —CHOH·R$^8$ or phenyl, optionally substituted with a halogen atom, a lower-alkyl group, a lower-alkyloxy group or a trihalomethyl group, wherein $R^6$ represents hydrogen, a lower-alkyl group, phenyl or phenyl substituted with one or more lower-alkyl or lower-alkyloxy groups, $R^7$ represents hydrogen or a lower-alkyl group, $R^8$ represents a lower-alkyl group, a phenyl group or a phenyl-lower-alkyl group, as well as the acid addition salts thereof with pharmaceutically acceptable acids.

It is an object of the present invention to provide novel compounds of Formula I, methods of making the same, a method for the alleviation, palliation, mitigation, or inhibition of the manifestations of certain physiological abnormalities of animals therewith, and pharmaceutical compositions comprising such novel compounds as active ingredient. Other objects will be apparent to one skilled in the art and still other objects will become apparent hereinafter.

The compounds of Formula I and the acid addition salts thereof have strong effects on the central nervous system. In animal experiments the compounds show a very pronounced potentiating effect on adrenaline and nor-adrenaline and also a very strong anti-reserpine effect. They moreover have sedative and anti-cholinergic effects. These effects, together with a relatively low toxicity make the compounds of Formula I as well as their acid addition salts useful as thymoleptics for treatment within the area of psychotherapy especially of endogenic depressions. Their improved lipoid solubility and improved clinical effectiveness indicate broad and significant utility for the products in the area mentioned.

The compounds of Formula I and the non-toxic acid addition salts thereof may be administered both orally and parenterally, for example in the form of tablets, capsules, powders, syrups or solutions for injection.

The invention moreover relates to a method for the preparation of compounds of Formula I, whereby a compound of the following formula:

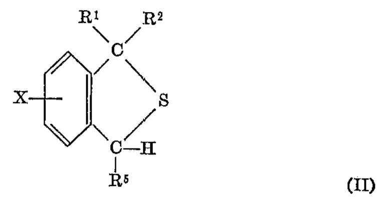

(II)

wherein $R^1$, $R^2$, $R^5$ and X are as defined above, is condensed with a compound of the formula:

$$\text{hal}\cdot\text{alkylene}\cdot\text{U} \qquad \text{(III)}$$

wherein "hal" is halogen, preferably chlorine, bromine or iodine, "alkylene" is as defined above and U is halogen or the group $$-N\begin{matrix} R^3 \\ R^4 \end{matrix}$$

where $R^3$ and $R^4$ are as defined above, in the presence of a condensing agent such as an alkali-metal-hydride or -amide, butyllithium or phenyllithium and, in the case where U is the group $$-N\begin{matrix} R^3 \\ R^4 \end{matrix}$$

isolating the resulting compound of Formula I either as the free amine or in the form of an acid addition salt thereof with a pharmaceutically acceptable acid, and in the case where $R^5$ is —COOR$^7$ is desired saponify the ester, and in the case where U is halogen reacting the intermediate halogen-compound with an amine $$HN\begin{matrix} R^3 \\ R^4 \end{matrix}$$

wherein $R^3$ and $R^4$ are as defined above, and isolating the resulting compound of Formula I either as the free amine or in the form of an acid addition salt thereof with a pharmaceutically acceptable acid.

When compounds of Formula I, wherein $R^5$ is —CO·NHR$^6$, are desired a better overall yield has often been obtained by first preparing a compound of Formula I, wherein $R^5$ is an ester group, and then reacting with an amine $H_2NR^6$ or $R^6NH\cdot Mg$ halogen and isolating the resulting amide.

In certain cases it has proved convenient in order to prepare a compound of Formula I, wherein $R^3$ is a lower-alkyl group and $R^4$ is hydrogen, $R^5$ is as defined above with the exception of —$COOR^7$, first to prepare a compound of Formula I, wherein $R^3$ and $R^4$ are lower-alkyl groups or one of $R^3$ and $R^4$ is a benzyl group and then dealkylate by reacting with a chloroformic acid ester of the formula $Cl\cdot COOR^9$, wherein $R^9$ is a lower-alkyl group or a benzyl group, hydrolyse the resulting compound of the formula:

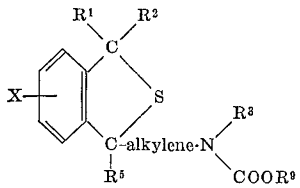

and isolate the compound of Formula I, wherein $R^3$ is a lower-alkyl group and $R^4$ is hydrogen, in conventional manner as the free amine or as an acid addition salt. This alternative method often gives a beter overall yield than the direct condensation with the aminoalkyl halide,

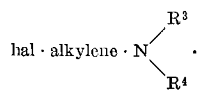

When compounds of Formula I wherein $R^5$ is —$CO\cdot R^8$ or —$CHOH\cdot R^8$ are desired, they may be prepared by reacting a compound of Formula I wherein $R^5$ is —$CO\cdot NH_2$ with a Grignard compound $R^8Mg$ hal, wherein $R^8$ is as defined above and hal is a chlorine, bromine or iodine atom, hydrolysing the reaction mixture with a dilute acid and isolating the compound of Formula I wherein $R^5$ is —$CO\cdot R^8$, and if desired reducing this group to —$CHOH\cdot R^8$ in well-known manner and isolating the thus obtained compound of Formula I in the form of the free base or a pharmaceutically acceptable salt thereof.

The starting compounds of Formula II, which also are novel compounds falling within the scope of the present invention may, when at least one of $R^1$ and $R^2$ is hydrogen, conveniently be prepared according to the following scheme:

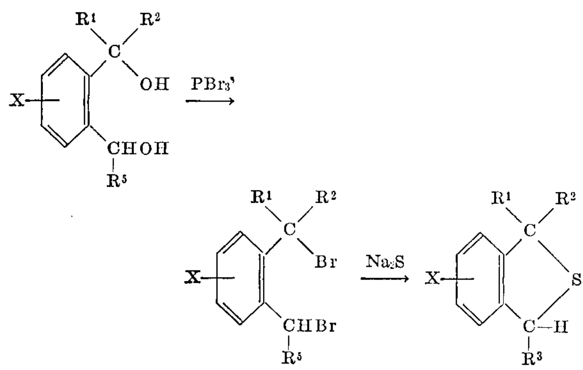

$R^5$ is preferably phenyl, optionally substituted with a halogen atom, a lower-alkyl group, a lower-alkyloxy group or a trihalomethyl group.

The phosphorous tribromide used according to the scheme may of course be substituted with any agent which will be able to substitute a hydroxyl group with a halogen atom such as phosphorous oxychloride, thionyl chloride or the like.

The starting compounds of Formula II, wherein $R^1$ and $R^2$ are as defined above and $R^5$ is an optionally substituted phenyl group may conveniently be prepared according to the following scheme:

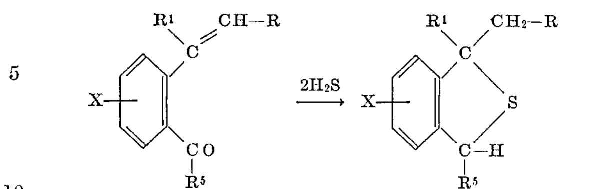

R is hydrogen or a lower-alkyl group. When only one mol of hydrogen sulphide is used in the reaction it will take the following course:

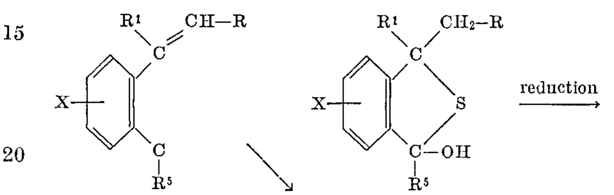

The starting compounds of Formula II may also be prepared according to the following scheme:

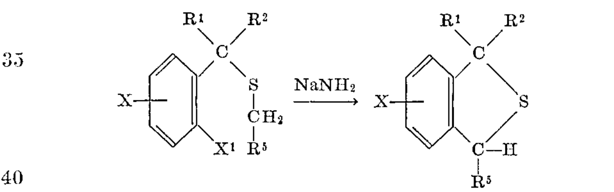

X, $R^1$, $R^2$ and $R^5$ are as defined above, and $X^1$ is a halogen atom. Especially when $R^5$ is —$COOR^7$, —CHO, or $CO\cdot R^8$, this method will be preferable.

Several of the important intermediate compounds defined in the previous sections are novel compounds and fall within the scope of the present invention.

The condensation according to the invention may preferably be carried out in an inert solvent especially dimethylsulfoxide. Other solvents such as benzene, toluene, xylene or the like have, however, also proved acceptacle.

As condensing agents may preferably be used alkali metal-hydrides or -amides, such as sodiumhydride, sodamide, potassium amide, or the like, but also metalorganic compounds such as butyllithium, phenyllithium, or the like have been found useful.

The acid addition salts of the novel compounds of Formula I are preferably salts of pharmacologically acceptable non-toxic acids such as mineral acids, for example, hydrochloric acid, hydrobromic acid, phosphoric acid, sulphuric acid, and the like, and organic acids such as acetic acid, tartaric acid, maleic acid, citric acid, methane sulphuric acid and the like.

In the foregoing Formula I and elsewhere herein, the terms lower-alkyl and lower-alkyloxy refer to alkyl or alkyloxy radicals containing up to and including eight carbon atoms, and preferably no more than three carbon atoms, which radicals may have either straight or branched-chain structure, for example methyl, ethyl, propyl, isopropyl, butyl, isobutyl, amyl, hexyl, heptyl, octyl, methoxy, ethoxy, propoxy, butoxy, amyloxy, hexyloxy, heptyloxy, or the like.

As representative examples of radicals in which $R^3$ and $R^4$ together with the nitrogen atom in Formula I represent the radical of a heterocyclic amine having a saturated five-membered or six-membered ring may be mentioned the pyrrolidine, piperidine, morpholine, thiamorpholine, N'-lower-alkyl-piperazine, e.g. N'-methylpiperazine, N'-lower-hydroxyalkylpiperazine, piperazine, or such radicals containing from one to four or even more C-lower-alkyl, e.g. C-methyl substituents, e.g. tetramethylpyrrolidine, and like radicals.

The thiophthalanes of Formula I, wherein at least one of $R^1$ and $R^2$ is lower-alkyl, and $R^5$ is optionally substituted phenyl, may also be prepared by treating a compound of the general formula:

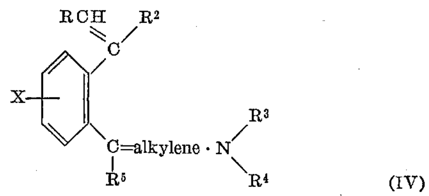

wherein R is a lower-alkyl group, with hydrogen sulphide and isolating the resulting compound of the formula:

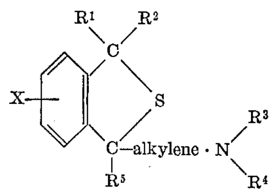

In the pharmacological testing, the compounds of Formula I, wherein X is hydrogen, $R^1$ and $R^2$ are hydrogen or methyl groups, "alkylene" is $—CH_2·CH_2·CH_2—$, and $R^3$ and $R^4$ are hydrogen or methyl groups, provided that both may not simultaneously be hydrogen, have been shown to have especially outstanding pharmacodynamic properties indicating high usefulness in treatment within the psychotherapy especially of endogenic depressions. Especially outstanding pharmacodynamic properties, together with a moderately low toxicity, were shown by 1-(3-methylaminopropyl)-1-phenyl - 3,3 - dimethyl-thiophthalane as well as acid addition salts thereof.

The following examples are given by way of illustration only and are not to be construed as limiting.

EXAMPLE 1

1-(3-dimethylaminopropyl)-1-phenyl-thiophthalane and its hydrochloride

The 1-phenylthiophthalane used as starting material was prepared in the following way:

74 grams of α-phenyl-phthalylalcohol (prepared by reduction of o-benzoylbenzoic acid with lithium aluminium hydride) were dissolved in 500 milliliters of carbontetrachloride and 70 grams of freshly distilled phosphorus tribromide dissolved in 200 milliliters of carbontetrachloride were added while stirring and keeping the temperature below zero degrees centigrade by cooling. Thereupon the temperature was allowed to raise to room temperature and the stirring continued for about 18 hours. The reaction temperature was then slowly raised to 70 degrees centigrade in the course of one hour, whereupon the reaction mixture was cooled, the liquid phase decanted from the precipitate, washed with ice water, dried over anhydrous magnesium sulphate, filtered and evaporated. The α-phenyl-phthalyl dibromide was obtained as a yellow oil. This oil was added dropwise and while stirring to a suspension of dry sodium sulphide in ethanol. After the addition had been completed the reaction mixture was heated under reflux for one hour on a steam bath. The sodium bromide formed by the reaction was filtered off, the solution evaporated, and the residue dissolved in ether, the ether phase washed with water, dried over anhydrous magnesium sulphate, filtered and distilled. Thereby 1-phenyl-thiophthalane was obtained as a yellow oil which boils at 135–140 degrees centigrade/0.1 mm. Hg. By crystallization from petroleum either it was obtained as a white crystalline substance melting at 60–62 degrees centigrade. Yield 42 grams.

2.7 grams of sodium hydride (50% suspension in mineral oil) were added to 40 milliliters of dimethylsulphoxide and heated to 100 degrees centigrade for five minutes. The solution was then cooled to 20 degrees centigrade and 10 grams of 1-phenyl-thiophthalane were added while stirring. The solution turned strongly red, and immediately 7 grams of 3-dimethylaminopropyl-chloride were added under continued stirring, which resulted in a vigorous reaction and a rise in temperature to about 40 degrees centigrade. The solution was then poured into ice water and extracted with ether. The ether solution was extracted with dilute hydrochloric acid, whereupon the aqueous extract was made alkaline with dilute sodium hydroxide solution. The base which separated out was taken over in ether, the ether phase dried over anhydrous potassium carbonate, filtered and evaporated on a steam bath. The residue was dissolved in 50 milliliters of acetone and the solution adjusted to pH 5 with a solution of dry hydrogen chloride in ether. Thereby 9 grams of the hydrochloride of 1-(3-dimethylaminopropyl) - 1 - phenyl-thiophthalane crystallized out and was sucked off. M.P. 200–202 degrees centigrade.

EXAMPLE 2

1-(3-methylaminopropyl)-1-phenyl-thiophthalane and its hydrochloride

When Example 1 was carried out using 7 grams of 3-methylaminopropyl chloride instead of 3-dimethylaminopropyl chloride, the hydrochloride of 1-(3-methylaminopropyl)-1-phenyl-thiophthalane was obtained as white crystals melting at 155–160 degrees centigrade. Yield 7 grams.

EXAMPLE 3

1-(3-dimethylaminopropyl)-1-phenyl-3-methyl-thiophthalane and its hydrochloride

The starting material, 1-methyl-3-phenyl-thiophthalane, was prepared in the following way:

1 mole of 3-phenylphthalide was dissolved in 500 milliliters of dry tetrahydrofuran and 1 mole of methylmagnesum iodide in ether was added dropwise under reflux. After 30 minutes the mixture was hydrolyzed with ice and dilute hydrochloric acid and the mixture extracted with ether. The ether phase was dried over anhydrous magnesium sulphate and evaporated on a steam bath. By crystallization of the residue from ether/petroleum ether (50/50) o-acetylbenzhydrol was obtained as a white crystalline substance melting at 95–97 degrees centigrade. Yield 0.75 mol.

2-methyl-α'-phenyl-phthalylalcohol was prepared as an oil by reduction of o-acetyl-benzhydrol with lithium aluminium hydride in dry ether.

From 36 grams of α-methyl-α'-phenylphthalyl alcohol is obtained 12 grams of 1-phenyl-3-methyl-thiophthalane exactly as described in Example 1 for the preparation of 1-phenyl-thiophthalane. B.P. 138–148 degrees centigrade/0.1 mm. Hg.

When Example 1 is carried out using 10 grams of 1-phenyl-3-methyl-thiophthalane instead of 1-phenyl-thiophthalane, the hydrochloride of 1-(3-dimethylaminopropyl)-1-phenyl-3-methyl-thiophthalane was obtained as white crystals which melt at 175–178 degrees centigrade. Yield 9.5 grams.

EXAMPLE 4

1-(3-dimethylaminopropyl)-1-phenyl-3,3-dimethyl-thiophthalane and its hydrochloride The starting 1-phenyl-3,3-dimethyl-thiophthalane was prepared in the following way:

55 grams (0.25 mole) of o-iso-propenyl-benzophenone were heated in an autoclave with 40 grams of hydrogen sulphide at 250–260 degrees centigrade for one hour. After cooling and evaporation of excess hydrogen sulphide the residue was extracted with petroleum ether, the extract filtered, treated with active carbon, filtered and cooled.

Thereby 30 grams of 1-phenyl-3,3-dimethyl-thiophthalane was obtained as a yellow substance which after recrystallization from petroleum ether melts at 70–72 degrees centigrade.

When Example 1 was carried out using the equivalent amount of 1-phenyl-3,3-dimethyl-thiophthalane instead of 1-phenyl-thiophthalane the hydrochloride of 1-(3-dimethylaminopropyl - 1 - phenyl-3,3-dimethyl-thiophthalene was obtained as colourless crystals which after recrystallization from ethanol melt at 224–226 degrees centigrade. Yield 10 grams.

EXAMPLE 5

1-(3-dimethylaminopropyl)-1-phenyl-3,3-dimethyl-thiophthalane and its its hydrochloride The starting material, 1-dimethylamino-4-(2′-isopropenyl-phenyl)-4-phenyl-buten-3 was prepared from 4-dimethylamino-1-(2′-isopropenyl-phenyl) - 1 - phenylbutanol-1 by treatment with thionyl chloride in the presence of pyridin and carbon tetrachloride as a solvent for the reaction. The hydrochloride melts at 170–173 degrees centigrade.

15 grams of 1-dimethylamino-4-(2′-isopropenylphenyl)-4-phenyl-buten-3 were reacted in an autoclave with 15 milliliters of hydrogen sulphide at 225–250 degrees centigrade for 2½ hours. The excess hydrogen sulphide was allowed to evaporate and the residue dissolved in dilute acetic acid and extracted with ether. The aqueous phase was made alkaline with aqueous ammonia and extracted with ether. The phase was dried over anhydrous sodium sulphate, filtered and evaporated. Thereby 10 grams of 1 - (3 - dimethylaminopropyl) - 1 - phenyl - 3,3 - dimethyl-thiophthalane were obtained. The hydrochloride melts at 224–226 degrees centigrade.

EXAMPLE 6

1-(3-methylaminopropyl)-1-phenyl-3,3-dimethyl-thiophthalane and its hydrochloride The starting material, 1-phenyl-3,3-dimethyl-thiophthalane, was prepared in the following way:

A mixture of 100 grams of o-iso-propenylbenzophenone, 0.5 gram of molybdenum sesquisulphide, and 100 grams of anhydrous hydrogen sulphide was heated in a 500 ml. autoclave for 3 hours at a temperature of 180–185 degrees centigrade. After cooling the excess of hydrogen sulphide was evaporated, the residue dissolved in 500 milliliters of petroleum ether, dried over anhydrous magnesium sulphate, treated with active carbon and filtered. The solution was evaporated to 300 milliliters and cooled. 87 grams (80%) of 1-phenyl-3,3-dimethylthiophthalane crystallized thereby as a light yellow substance which melts at 67–69 degrees centigrade. Upon recrystallization from petroleum ether, it was obtained as white crystals which melt at 71–72 degrees centigrade.

When Example 2 was carried out using 1-phenyl-3,3-dimethyl-thiophthalane instead of 1-phenyl-thiophthalane, the hydrochloride of 1-(3-methylaminopropyl)-1-phenyl-3,3-dimethyl-thiophthalane was obtained by crystallization from acetone as a white crystalline substance which melts at 173–174 degrees centigrade.

EXAMPLE 7

1-(3-methylaminopropyl)-1-phenyl-3-methyl thiophthalane and its hydrochloride When Example 2 was carried out using 1-phenyl-3-methyl-thiophthalane instead of 1-phenyl-thiophthalane, the hydrochloride of 1-(3-methylaminopropyl)-1-phenyl-3-methyl-thiophthalane was obtained as white crystals which melt at 156–162 degrees centigrade.

EXAMPLE 8

1-(3-methylaminopropyl)-1-phenyl-3,3-dimethyl-thiophthalane and its hydrochloride The starting material, 1-phenyl-3,3-dimethyl-thiophthalane, was prepared in the following way:

A mixture of 100 grams of o-iso-propenylbenzophenone, 1 gram molybdenum sesquisulphide and 50 grams of hydrogen sulphide was heated in a 500 ml. autoclave for 16 hours at 120 degrees centigrade. After cooling, the excess of hydrogen sulphide was evaporated and the residue worked up as described in Example 6. 50 grams of 1-phenyl-3,3-dimethyl-thiophthalane-ol-1 were obtained as white crystals which melt at 84–85 degrees centigrade. 38 grams of this thiophthalanol were heated for two hours on a steam bath with 100 milliliters of anhydrous formic acid. Carbon dioxide escaped from the reaction mixture and the thiophthalane obtained by the reduction separated gradually as a yellow oil. 150 grams of finely crushed ice was added and the 1-phenyl-3,3-dimethyl-thiophthalane which crystallizes out was, after recrystallization from petroleum ether, obtained in a yield of 30 grams. M.P. 72–73 degrees centigrade.

30 grams of 1-phenyl-3,3-dimethyl-thiophthalane were dissolved in 200 milliliters of dry ether and 35 grams of a 25 percent solution of butyllithium in hexane were added while stirring and cooling in an atmosphere of nitrogen. The solution was heated to 18–20 degrees centigrade for one minute and cooled to zero degrees centigrade. While cooling and stirring, 16 grams of 3-methylaminopropylchloride were added. Thereupon the solution was poured into ice water and worked up as described in Eaxple 1. 33 grams of the hydrochloride of 1-(3-methylaminopropyl)-1-phenyl-3,3-dimethyl-thiophthalane were obtained as white crystals which melt at 173–174 degrees centigrade.

EXAMPLE 9

1-(3-aminopropyl)-1-phenyl-3,3-dimethyl-thiophthalane and its benzoate

The 1-phenyl-3-dimethyl-thiophthalane used as starting material was prepared in the following way:

A mixture of 170 grams of 2-(2-chloro-phenyl)-propanol-2, 150 grams of benzyl mercaptan and 750 milliliters concentrated hydrochloric acid was stirred for 18 hours on a steam bath, whereupon the reaction mixture was poured onto finely crushed ice, extracted with ether, the ether phase washed with dilute sodium hydroxide solution, dried over anhydrous magnesium sulphate, treated with active carbon, filtered and distilled. 2-(2-chloro-phenyl)-2-benzylmercapto-propane was obtained in a yield of 171 grams and boils at 149–151 degrees centigrade at 0.7 mm. Hg.

A mixture of 4.8 grams of sodium hydride (in oil suspension 50% w./w.) and 250 milliliters of dimethylsulfoxide was heated on a steam bath, thereafter cooled to 20 degrees centigrade and 57 grams of 2-(2-chloro-phenyl)-2-benzylmercapto-propane were added, keeping the temperature between 20–30 degrees centigrade. After the addition had been completed; the mixture was stirred at room temperature for 15 minutes, whereupon the mixure was poured onto finely crushed ice and extracted with ether. The ether solution was dried and the ether evaporated on a steam bath. Upon recrystallization of the residue from ether-petroleum ether (1:1), 1-phenyl-3,3-dimethyl-thiophthalane was obtained in a yield of 39 grams. It melts at 70–72 degrees centigrade.

When Example 4 was carried out using 5.4 grams of sodium hydride instead of 2.7 grams and the equivalent amount of the hydrochloride of 3-aminopropyl chloride instead of 3-dimethylaminopropyl chloride and using a solution of benzoic acid instead of a solution of hydrogen chloride, the benzoate of 1-(3-aminopropyl)-1-phenyl-3,3-dimethyl-thiophthalane was obtained as a white crystalline substance which melts at 197–200 degrees of centigrade.

EXAMPLE 10

1-(3-methylaminopropyl)-1-phenyl-3,3-dimethyl-thiophthalane and its hydrochloride A mixture of 15 grams (0.63 mole) of sodium hydride in oil suspension (50%) and 400 milliliters of dimethylsulfoxide was heated on a steam bath, then cooled to 20 degrees centigrade and 55 grams (0.2 mole) of 2-(2-chlorophenyl) - 2 - benzylmercaptopropane were added dropwise while keeping the temperature between 20–30 degrees centigrade. The mixture was stirred for a further 5 minutes at about 20 degrees centigrade, whereupon 32 grams of the hydrochloride of 3-methylaminopropyl chloride were added, and the stirring continued until the red color had disappeared. The reaction mixture was then poured onto finely crushed ice and extracted with ether. The either phase was separated and extracted with dilute acetic acid. The acetic acid solution was made alkaline with dilute aqueous ammonia and extracted with ether. The ether phase was dried over anhydrous magnesium sulphate, treated with active carbon and evaporated. The residue was dissolved in acetone and neutralized with a solution of hydrogen chloride in ether. The crystalline precipitate was filtered off and recrystallized from acetone. Yield 31 grams of the hydrochloride of 1 - (3 - methylaminopropyl) - 1 - phenyl - 3,3 - dimethyl-thiophthalane, which melts at 173–174 degrees centigrade.

EXAMPLE 11

1-(3-dimethylaminopropyl)-1-carbamyl-3,3-dimethyl-thiophthalane and its hydrochloride The starting material, 1-carbamyl - 3,3 - dimethyl-thiophthalane, was prepared in the following way:

A mixture of 341 grams of 2-(2-chlorophenyl)-propanol-2, 340 grams of thioglycolic acid and 1250 milliliters of concentrated hydrochloric acid was heated while stirring on a steam bath for four hours, poured onto finely crushed ice and extracted with ether. The ether phase was extracted with dilute aqueous ammonia, and the aqueous extract made acid with dilute hydrochloric acid and extracted with ether. The ether phase was dried over anhydrous magnesium sulphate, the ether evaporated and excess of thioglycolic acid distilled off in vacuum. The residue was recrystallized from ether/petroleum ether (1:1) and (1-methyl-1-(2-chlorophenyl)-ethylmercapto)-acetic acid obtained as colorless crystals which melt at 53–54 degrees centigrade. Yield 367 grams.

A mixture of 53 grams of sodium hydride in oil suspension (50%) and 1300 milliliters of dimethylsulphoxide was heated on a steam bath. After the reaction had been completed the mixture was cooled and 245 grams of (1-methyl-1-(2-chlorophenyl)-ethylmercapto)-acetic acid dissolved in dimethylsulphoxide added dropwise at 20–30 degrees centigrade. After stirring at 20 degrees centigrade for five minutes, the reaction mixture was poured onto finely crushed ice and the resulting mixture extracted with ether. The aqueous phase was made acid with concentrated hydrochloric acid and extracted with ether. The ether phase was dried over anhydrous magnesium sulphate and evaporated. The residue was recrystallized from ether/petroleum ether (50:50) and 187 grams of 3,3-dimethyl-thiophthalane-carboxylic acid-1 were obtained as a white crystalline substance which melts at 86–87 degrees centigrade.

A mixture of 100 grams of 3,3-dimethyl-thiophthalane-carboxylic acid-1 and 230 grams of thionyl chloride was heated under reflux for 15 minutes. The excess of thionyl chloride was distilled off, and the residue which mainly consisted of 3,3-dimethyl-thiophthalane-carboxylic acid chloride-1, was dissolved in chloroform and added dropwise to excess of liquid ammonia. The mixture was stirred for 30 minutes, heated to reflux temperature, water added and extracted with chloroform. The chloroform phase was dried, treated with active carbon, filtered and evaporated. The residue was recrystallized from ether and 87 grams of 1-carbamyl-3,3-dimethyl-thiophthalane were obtained as a white crystalline substance which melts at 124–125 degrees centigrade.

To 20 grams of sodamide in liquid ammonia were added 52 grams of 1-carbamyl-3,3-dimethyl-thiophthalane while stirring and the stirring was continued for 30 minutes, whereupon 27 grams of 3-dimethylaminopropyl chloride were added and the stirring continued for 15 minutes. Then 30 grams of ammonium chloride were added and the mixture poured onto ice and extracted with ether. The ether phase was extracted with dilute acetic acid. The aqueous phase was washed with ether, made alkaline with aqueous ammonia and extracted with ether. The ether phase was dried over anhydrous magnesium sulphate, treated with active carbon and evaporated. The residue was dissolved in acetone and the hydrochloride of 1-(3-dimethylaminopropyl) - 1 - carbamyl - 3,3 - dimethyl-thiophthalane was precipitated by neutralization with a solution of hydrogen chloride in ether. After recrystallization from acetone it melts at 208–210 degrees centigrade. Yield 27 grams.

EXAMPLE 12

1-(3-dimethylaminopropyl)-1-carbethoxy-3,3-dimethyl-thiophthalane and its hydrochloride and oxalate The starting material, 1-carbethoxy - 3,3 - dimethyl-thiophthalane, was prepared in the following way:

100 grams of 3,3-dimethyl-thiophthalane-carboxylic acid-1, 300 milliliters of absolute ethanol and 10 milliliters of concentrated sulphuric acid were refluxed for 18 hours, cooled, poured onto finely crushed ice and made alkaline with sodium hydrogen carbonate and extracted with ether. The ether phase was dried over anhydrous magnesium sulphate, treated with active carbon and distilled. Yield 95 grams of 1-carbethoxy-3,3-dimethyl-thiophthalane which boils at 108–111 degrees centigrade/0.2 mm. Hg.

A mixture of 6 grams of sodium hydride in oil spspension (50%) and 250 milliliters of dimethylsulfoxide was heated on a steam bath until the reaction had been completed.

At a temperature of 20–30 degrees centigrade were added 53 grams of 1-carbethoxy - 3,3 - dimethylthiophthalane and then 22 grams of 3-dimethylaminopropyl chloride. The stirring was continued for 5 minutes, whereupon the mixture was poured onto ice and worked up as described in Example 11. The hydrochloride of 1-(3-dimethylaminopropyl) - 1 - carbethoxy - 3,3 - dimethyl-thiophthalane was thereby obtained as white crystals which melt at 146–148 degrees centigrade. Yield 45 grams. The free base boils at 150–152 degrees centigrade/0.2 mm. Hg. The corresponding oxalate melts at 132–140 degrees centigrade.

EXAMPLE 13

1-(3-dimethylaminopropyl)-3,3-dimethyl-thiophthalene-carbonic acid-1 and its hydrochloride A mixture of 31 grams of 1-(3-dimethylaminopropyl)-1-carbethoxy-3,3-dimethyl-thiophthalene, 8.5 grams of potassium hydroxide and 250 milliliters of ethanol was refluxed for 4 hours, whereupon the mixture was neutralized to pH 5–6 with a solution of hydrogen chloride in ether and cooled. The precipitated potassium chloride was filtered off. The filtrate was evaporated and dry ether added. The precipitate consisted of 1-(3-dimethylaminopropyl) - 3,3 - dimethyl - thiophthalene - carbonic acid-1 which, after recrystallization from acetone/chloroform (1:1), melts at 184–185 degrees centigrade. Yield 17 grams. The corresponding hydrochloride melts at 209–211 degrees centigrade after recrystallization from acetone.

EXAMPLE 14

1-(3-dimethylaminopropyl)-1-carbomethoxy-3,3-dimethyl-thiophthalene and its hydrochloride When Example 12 was carried out using methanol instead of ethanol, isolating the intermediate 1-carbomethoxy-3,3-dimethyl-thiophthalene, which boils at 122–124 degrees centigrade/0.5 mm. Hg, and otherwise proceeding as described in Example 12, the hydrochloride of 1-(3-dimethylaminopropyl) - 1 - carbomethoxy - 3,3 - dimethyl-thiophthalene was obtained as a white crystalline substance which melts at 153–154 degrees centigrade.

The carbomethoxy compound may, however, also be obtained by directly esterifying 1-(3-dimethylaminopropyl)-3,3-dimethyl-thiophthalene-carbonic acid-1 as follows:

A mixture of 30 grams of 1-(3-dimethylaminopropyl)-3,3-dimethyl-thiophthalene-carbonic acid-1, 15 milliliters of conc. sulphuric acid and 250 milliliters of dry methanol was refluxed for four hours, whereupon the mixture was poured onto finely crushed ice, made alkaline with aqueous ammonia and extracted with ether. The ether phase was dried over anhydrous magnesium sulphate and evaporated. The residue was dissolved in acetone and the crystalline hydrochloride of 1-(3-dimethylaminopropyl)-1-carbomethoxy-3,3-dimethyl-thiophthalane precipitated by neutralizing with a solution of hydrogen chloride in ether. It melts after recrystallization from acetone at 153–154 degrees centigrade. Yield 16 grams.

EXAMPLE 15

1-(3-dimethylaminopropyl)-1-phenylcarbamyl-3,3-dimethyl-thiophthalene and its hydrochloride A solution of methylmagnesium iodide in dry ether was prepared in well known manner from 0.175 mole of methyl iodide and 0.33 mole of magnesium. To this solution were added 25 grams of dry aniline and, after refluxing for ten minutes, 21 grams of 1-(3-dimethylaminopropyl)-1-carbethoxy-3,3 - dimethyl - thiophthalane. The mixture was refluxed for 2 hours, then hydrolysed with dilute hydrochloride acid and washed with ether. The aqueous phase was made alkaline and extracted with ether. The ether phase was evaporated and excess aniline removed by distillation. The residue was dissolved in dilute hydrochloric acid, washed with ether, made alkaline and extracted with ether. The ether phase was dried and evaporated, the residue dissolved in acetone and the hydrochloride of 1-(3-dimethylaminopropyl)-1-phenylcarbamyl-3,3-dimethyl-thiophthalane precipitated by neutralization with a solution of hydrogen chloride in ether as white crystals which, after recrystallization from chloroform, melt at 209–210 degrees centigrade. Yield 16 grams.

EXAMPLE 16

1-(3-dimethylaminopropyl - 1 - 2,6 - dimethylphenylcarbamyl)-3,3-dimethyl-thiophthalane and its hydrochloride When Example 15 was carried out using the equivalent amount of 2,2-dimethylaniline instead of aniline, the hydrochloride of 1 - (3 - dimethylaminopropyl-1-(2,6-dimethylphenylcarbamyl)-3,3 - dimethyl-thiophthalane was obtained as white crystals which melt at 193–194 degrees centigrade. The free base crystallizes from petroleum ether and melts at 108–110 degrees centigrade.

EXAMPLE 17

1-(3-dimethylaminopropyl)-1-acetyl-3,3-dimethyl-thiophthalene and its hydrochloride To a solution of methylmagnesium iodide in dry ether prepared in well known manner from 0.40 mole of methyl iodide were added 27 grams of 1-(3-dimethylaminopropyl)-1-carbamyl-3,3-dimethyl-thiophthalene dissolved in 150 milliliters of dry benzene. The reaction mixture was refluxed for 18 hours, the solvents evaporated and the residue heated on a steambath for 4 hours, whereupon it was dissolved in dilute hydrochloric acid and extracted with ether. The aqueous phase was made alkaline with aqueous ammonia and extracted with ether. The ether phase was dried over anhydrous magnesium sulphate, treated with active carbon and evaporated. The residue was dissolved in acetone and neutralized with a solution of hydrogen chloride in ether. The precipitate, which was filtered off and dried, and consisted of the hydrochloride of 1-(3-dimethylaminopropyl-1-acetyl-3,3-dimethyl-thiophthalane which, after recrystallization from chloroform/acetone (1:1) melts at 144–147 degrees centigrade. Yield 4 grams.

EXAMPLE 18

Other 1-(3-aminopropyl)-1-phenyl-3,3-dimethyl-thiophthalanes and their hydrochlorides When Example 4 was carried out using the equivalent amounts of 3-diethylaminopropylchloride, 3-di-n-butylaminopropylchloride, 3-N-piperidinylpropylchloride, 3-(N′-methyl-N-piperazinyl)propylchloride and 3-(4-morpholinyl)propylchloride, respectively, instead of 3-dimethylaminopropylchloride, the hydrochlorides of 1-(3-diethylaminopropyl)-1-phenyl-3,3 - dimethyl - thiophthalane (M.P. 130–132 degrees centigrade), 1-(3-di-n-butylaminopropyl)-1-phenyl-3,3-dimethyl-thiophthalane, 1-(3-N-piperidinylpropyl)-1-phenyl-3,3 - dimethyl - thiophthalane (M.P. 190–192 degrees centigrade), 1-[3-(N′-methyl-N-piperazinyl) - propyl] - 1 - phenyl - 3,3 - dimethyl-thiophthalane and 1-[3-(4-morpholinyl)-propyl]-1-phenyl-3,3-dimethyl-thiophthalane were obtained as white crystalline substances.

EXAMPLE 19

1-(2-dimethylaminoethyl)-1-phenyl-3,3-dimethyl-thiophthalane and its hydrochloride When Example 4 was carried out using the equivalent amount of 2-dimethylaminoethyl chloride instead of 3-dimethylaminopropyl chloride, the hydrochloride of 1-(2-dimethyl - aminoethyl)-1-phenyl-3,3-dimethyl-thiophthalane was obtained as a white crystalline substance.

EXAMPLE 20

1-(3-methylaminopropyl)-1-phenyl-3,3-dimethyl-thiophthalane and its hydrochloride To a solution of 33 grams (0.1 mole) of 1-(3-dimethylaminopropyl)-1-phenyl - 3,3 - dimethyl-thiophthalane in 250 milliliters of dry benzene 33 grams (0.3 mole) of ethylchloroformate were added dropwise while stirring. The temperature rose to about 35 degrees centigrade. After the addition had been completed, the mixture was heated for 1½ hours at 40 degrees centigrade while stirring. After cooling, the reaction mixture was washed with dilute hydrochloric acid and evaporated on a steam bath and finally at reduced pressure. 1-[3-(N-carbethoxymethylamino)propyl] - 1 - phenyl - 3,3 - dimethyl-thiophthalane was thereby obtained as a yellow oil.

The thus obtained yellow oil was boiled for 20 hours under reflux with a mixture of 18 milliliters of water, 18 grams of potassium hydroxide and 125 milliliters of diethyleneglycol-monomethylether. After cooling, the reaction mixture was poured into 600 milliliters of water and extracted with ether. The ether phase was then extracted twice with dilute acetic acid, and the acid extract made alkaline with aqueous ammonia, whereupon the oil which separated was extracted with ether. The ether phase was dried over anhydrous potassium carbonate, filtered and evaporated on a steam bath. The residue was dissolved in 100 milliliters of acetone and neutralized to pH 5 with a solution of dry hydrogen chloride in ether. The white crystals which separated out consisted of the hydrochloride of 1-(3-methylaminopropyl)-1-phenyl-3,3-dimethyl-thiophthalane and melted at 173–174 degrees centigrade. Yield 15 grams.

EXAMPLE 21

Other 1-(3-dimethylaminopropyl)-substituted thiophthalanes and their hydrochlorides When Example 1 was carried out using the equivalent amount of 1-p-tolyl-3,3-dimethyl-thiophthalane,
1-p-fluorophenyl-3,3-dimethyl-thiophthalane,
1-m-trifluoromethyl-phenyl-3,3-dimethyl-thiophthalane,
1-phenyl-3,3-dimethyl-6-chloro-thiophthalane,
1-p-chlorophenyl-3,3-dimethyl-thiophthalane and
1-p-methoxyphenyl-3,3-dimethyl-thiophthalane, respectively, instead of 1-phenyl-thiophthalane, the hydrochlorides of 1-(3-dimethylaminopropyl)-1-p-tolyl-3,3-dimethyl-thiophthalane,
1-(3-dimethylaminopropyl)-1-p-fluorophenyl-3,3-dimethyl-thiophthalane,
1-(3-dimethylaminopropyl)-1-m-trifluoromethylphenyl-3,3-dimethyl-thiophthalane,
1-(3-dimethylaminopropyl)-1-phenyl-3,3-dimethyl-6-chloro-thiophthalane,
1-(3-dimethylaminopropyl)-1-p-chlorophenyl-3,3-dimethyl-thiophthalane and
1-(3-dimethylaminopropyl)-1-p-methoxyphenyl-3,3-dimethyl-thiophthalane, respectively, were obtained.

EXAMPLE 22

Other 1-(3-dimethylaminopropyl)-substituted thiophthalanes and their salts

The following 1-(3-dimethylaminopropyl)-substituted thiophthalanes were prepared and isolated as the salts exactly as described in Example 1 using the appropriately substituted thiophthalene:

1-(3-dimethylaminopropyl)-1-phenyl-3,3-dimethyl-4-methoxy-thiophthalane, HCl
1-(3-dimethylaminopropyl)-1-phenyl-3,3-dimethyl-6-ethyl-thiophthalane, HCl
1-(3-dimethylaminopropyl)-1-phenyl-3,3-dimethyl-5-trifluoromethyl-thiophthalane, oxalate (M.P. 148–150° C.)
1-(3 - dimethylaminopropyl) - 1-phenyl-3,3-di-isopropyl-thiophthalane, HCl.

The compounds of Formula I and the non-toxic acid addition salts thereof may be administered both orally and parenterally, and may be used for example in the form of tablets, capsules, powders, syrups or in the form of the usual sterile solutions for injection.

Most conveniently the compounds of Formula I are administered orally in unit dosage form such as tablets or capsules, each dosage unit containing a non-toxic acid adition salt of one of the said compounds in an amount of from about 0.1 to about 100 mg., most preferably, however, from about 0.5–25 mg., calculated as the free amine, the total daily dosage usually ranging from about 0.5 to about 300 mg. The exact individual dosages as well as daily dosages in a particular case will, of course, be determined according to established medical or veterinary principles.

Where the foregoing examples produce a compound having a methyl or other lower-alkyl group, it is to be understood that compounds containing other lower-alkyl groups of straight or branched nature and containing up to eight carbon atoms inclusive, such as methyl, ethyl, propyl, isopropyl, butyl, sec.-butyl, t.-butyl, amyl, isoamyl, hexyl, heptyl, and octyl, are prepared in the same manner by substitution in the process of the appropriate different lower-alkyl starting material. Hydroxylower-alkyl radicals may carry primary, secondary, or tertiary hydroxyl groups and have the same carbon atom limit action as lower-alkyl. Likewise, where chloro or other halogen atom is present, although chlorine is preferred, further halogen compounds including iodo, bromo, chloro, and fluoro compounds are perpared starting from the appropriate halogenated starting material. Similarly, where methoxy or other lower-alkoxy group is present, compounds having other lower-alkoxy groups containing various lower-alkyl groups having up to eight carbon atoms inclusive are prepared in the same manner from the appropriate different lower-alkoxy starting material. Moreover, when one dilower-alkyl-amino group, such as the dimethylamino group, is present in a compound, other dilower-alkylamino compounds are prepared in the same manner starting only with the selected different dilower-alkylamino compound. In the same manner, ortho and meta substituted products are produced instead of the para by utilizing the selected ortho or meta substituted starting material, and vice versa. Similarly, other molecular changes within the scope of the invention are readily made.

The compounds of the invention are generally characterized by the pharmacological activity hereinbefore stated, making them useful in counteracting certain physiological abnormalities in a living animal body. Effective quantities of the pharmacologically active compounds of the invention may be administered to a living animal body in any one of various ways, for example, orally as in capsules or tablets, parenterally in the form of sterile solutions, suspensions, or by pellet implantation, and in some cases intravenously in the form of sterile solutions. Other modes of administration are cutaneously, subcutaneously, bucally, intramuscularly, and intraperitoneally.

As representative of living animals bodies which may be treated with the compounds and compositions of the invention, and according to the method of treating of the invention, for alleviation of the same and/or similar conditions as those described, may be mentioned the following: domestic animals such as dogs and cats, farm animals such as horses, cows, sheep, and goats, fur-bearing animals such as mink, seal, muskrat, fox, raccoon, ermine, and weasel, and zoo animals such as bears, gnus, foxes, monkeys, baboons, and the like.

Pharmaceutical formulations are usually prepared from a predetermined quantity of one or more of the compounds of the invention, preferably in solid form. Such formulations may take the form of powders, elixirs, solutions, pills, capsules, pellets or tablets, with or without, but preferably with, any one of a large variety of pharmaceutically acceptable vehicles or carriers. When in admixture with a pharmaceutical vehicle or carrier, the active ingredient usually comprises from about 0.01 to about 75 percent, normally from about 0.05 to about 15 percent, by weight of the composition. Carriers such as starch, sugar, talc, commonly used synthetic and natural gums, water, and the like, may be used in such formulations. Binders such as gelatin, and lubricants such as sodium stearate, may be used to form tablets. Disintegrating agents such as sodium bicarbonate may also be included in tablets.

Although relatively small quantities of the active materials of the invention, even as low as 0.1 milligram, may be used in cases of administration to subjects having a relatively low body weight, unit dosages are usually five milligrams or above and preferably twenty-five, fifty, or one-hundred milligrams or even higher, depending of course upon the subject treated and the particular result desired, as will be apparent to one skilled in the art. Broader ranges appear to be one to 500 milligrams per unit dose. The active agents of the invention may be combined for administration with other pharmacologically active agents, such as analgesics, sedatives, tranquilizers, steroids or hormones, or the like, or with buffers, antacids or the like, and the proportion of the active agent or agents in the compositions may be varied widely. It is only necessary that the active ingredient of the invention constitute an effective amount, i.e. such that a suitable effective dosage will be obtained consistent with the dosage form employed. Obviously, several unit dosage forms may be administered at about the same time. The exact individual dosages as well as daily dosages in a particular case will of course be determined according to well-established medical and/or veterinary principles.

When preparing tablets, the active ingredient is for the most part mixed with ordinary tablet adjuvants such as corn starch, potato starch, talcum, magnesium stearate, gelatine, lactose, gums, or the like. A suitable formula for a tablet containing 10 mg. of 1-(3-methylaminopropyl)-1-phenyl-3,3-dimethyl-thiophthalane (called Lu 5-003 for short) in the form of its hydrochloride is as follows:

| | Mg. |
|---|---|
| Lu 5-003, hydrochloride | 11.2 |
| Potato starch | 36 |
| Lactose | 18 |
| Gelatine | 5 |
| Talcum | 6 |
| Magnesium stearate | 0.4 |

Another suitable formulation for a tablet containing 10 milligrams of Lu 5-003 is as follows:

| | Mg. |
|---|---|
| Lu 5-003, hydrochloride | 11.2 |
| Potato starch | 40 |
| Polyvinylpyrrolidone | 5 |

Sugar coated and colored.

A suitable formulation for a capsule containing 10 milligrams of Lu 5-003 is as follows:

| | Mg. |
|---|---|
| Lu 5-003, hydrochloride | 11.2 |
| Corn starch | 90 |
| Lactose | 50 |
| Talcum | 2 |

Filled in a gelatine capsule.

A suitable formulation for an injectable solution containing one percent of Lu 5-003 in the form of its hydrochloride is as follows:

| | Mg. |
|---|---|
| Lu 5-003, hydrochloride | 11.2 |
| Sorbitol | 40 |

Sterile water to make 1 ml.

Any other pharmaceutical tableting adjuvants may be used provided that they are compatible with the active ingredient, and additional compositions and dosage forms may be similar to those presently used for thymoleptics, such as imipramine, amitriptyline or nortriptyline. Also combination of the compounds of Formula I as well as their non-toxic acid salts with other active ingredients especially other thymoleptics, neuroleptics, tranquilizers, or the like fall within the scope of the present invention.

As previously stated, when isolating the compounds of Formula I in the form of an acid addition salt, the acid is preferably selected so as to contain an anion which is non-toxic and pharmacologically acceptable, at least in usual therapeutic doses. Representative salts which are included in this preferred group are the hydrochlorides, hydrobromides, sulphates, acetates, phosphates, nitrates, methanesulphonates, ethanesulphonates, lactates, citrates, tartrates or bitartrates, and maleates of the amines of Formula I. Other acids are likewise suitable and may be employed if desired. For example, fumaric, benzoic, ascorbic, succinic, salicylic, bismethylene-salicylic, propionic, gluonic, malic, malonic, mandelic, cinnamic, citraconic, stearic, palmitic, itaconic, glycolic, benzenesulphonic, and sulphamic acids may also be employed as aid addition salt forming acids. When it is desired to isolate a compound of the invention in the form of the free base, this may be done according to conventional procedure, as by dissolving the isolated or unisolated salt in water, treating with a suitable alkaline material, extracting the liberated free base with a suitable organic solvent, drying the extract, and evaporating to dryness of fractionally distilling to effect isolation of the free basic amine.

It is to be understood that the invention is not to be limited to the exact details of operation or exact compounds, compositions, or procedures shown and described as obvious modifications and equivalents will be apparent to one skilled in the art, and the invention is therefore to be limited only by the scope of the appended claims.

What we claim is:

1. A compound selected from the group consisting of (a) compounds of the general formula:

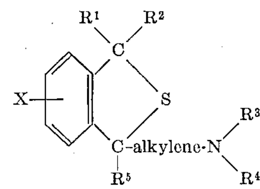

wherein $R^1$ and $R^2$ each is selected from the group consisting of hydrogen and lower-alkyl, $$-N\begin{matrix}R^3\\R^4\end{matrix}$$

is selected from the class consisting of amino, mono-lower-alkylamino, di-lower-alkylamino, benzyl - lower-alkylamino, di-benzyl-amino, the radical of a saturated five -membered ring heterocyclic amine and the radical of a saturated six-membered ring heterocyclic amine, selected from the group consisting of pyrrolidine, piperidine, morpholine thiamorpholine, N'-lower-alkyl-piperazine, N'-lower-hydroxyalkyl-piperazine, piperazine, and such radicals containing from one to four C-lower-alkyl substituents, "alkylene" is an alkylene chain having two to six carbon atoms, inclusive, at least two carbon atoms being in the chain directly connecting the ring carbon atom with the nitrogen atom, $R^5$ is selected from the group consisting of —CO·NHR$^6$, —COOR$^7$, —CO·R$^8$, —CHOH·R$^8$ and phenyl optionally substituted with a substituent selected from the group consisting of halogen, lower-alkyl, lower-alkyloxy and trihalomethyl, wherein $R^6$ is selected from the group consisting of hydrogen, lower-alkyl and phenyl optionally substituted with a substituent selected from the class consisting of lower-alkyl and lower-alkoxy, $R^7$ is selected from the group consisting of hydrogen and lower-alkyl and $R^8$ is selected from the group consisting of lower-alkyl, phenyl and phenyl-lower-alkyl and X is selected from the group consisting of hydrogen, halogen, lower-alkyl, lower-alkyloxy and trihalomethyl, and (b) acid addition salts thereof with pharmaceutically acceptable acids.

2. A compound according to claim 1 of the following formula:

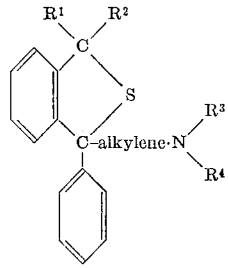

wherein $R^1$, $R^2$, $R^3$ and $R^4$ each is lower-alkyl and "alkylene" is an alkylene chain having two to six carbon atoms, inclusive, at least two carbon atoms being in the chain directly connecting the ring carbon atom with the nitrogen atom.

3. An acid addition salt with a pharmaceutically acceptable acid of a compound according to claim 1 of the following formula:

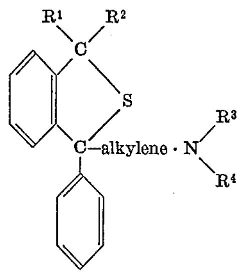

wherein $R^1$, $R^2$, $R^3$ and $R^4$ each is lower-alkyl and "alkylene" is an alkylene chain having two to six carbon atoms, inclusive, at least two carbon atoms being in the chain directly connecting the ring carbon atom with the nitrogen atom.

4. A compound according to claim 1 of the following formula:

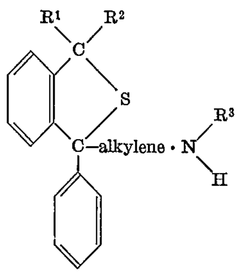

wherein $R^1$, $R^2$ and $R^3$ each is lower-alkyl and "alkylene" is an alkylene chain having two to six carbon atoms, inclusive, at least two carbon atoms being in the chain directly connecting the ring carbon atom with the nitrogen atom.

5. An acid addition salt with a pharmaceutically acceptable acid according to claim 1 of a compound of the following formula:

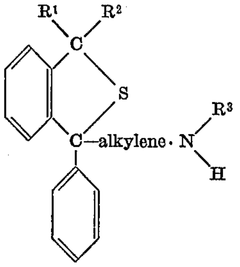

wherein $R^1$, $R^2$ and $R^3$ each is lower-alkyl and "alkylene" is an alkylene chain having two to six carbon atoms, inclusive, at least two carbon atoms being in the chain directly connecting the ring carbon atom with the nitrogen atom.

6. A compound according to claim 1 which is 1-(3-methylaminopropyl) - 1 - phenyl - 3,3 - dimethyl-thiophthalane.

7. A compound according to claim 1 which is a pharmaceutically acceptable acid addition salt of 1-(3-methylaminopropyl)-1-phenyl-3,3-dimethyl-thiophthalane.

8. A compound according to claim 1 which is the hydrochloride of 1-(3-methylaminopropyl)-1-phenyl-3,3-dimethyl-thiophthalane.

9. A compound according to claim 1 which is 1-(3-dimethylaminopropyl) - 1 - phenyl - 3,3 - dimethyl - thiophthalane.

10. A compound according to claim 1 which is a pharmaceutically acceptable acid addition salt of 1-(3-dimethylaminopropyl) - 1 - phenyl - 3,3 - dimethyl-thiophthalane.

11. A compound according to claim 1 which is the hydrochloride of 1-(3-dimethylaminopropyl)-1-phenyl-3,3-dimethyl-thiophthalane.

12. A compound of the general formula:

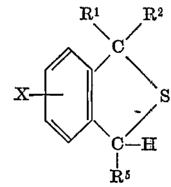

wherein $R^1$ and $R^2$ each is selected from the group consisting of hydrogen and lower-alkyl, $R^5$ is selected from the group consisting of phenyl optionally substituted with a substituent selected from the group consisting of halogen, lower-alkyl, lower-alkyloxy and trihalomethyl, —CO·NHR$^6$ and —COOR$^7$, wherein $R^6$ is selected from the group consisting of hydrogen, lower-alkyl and phenyl optionally substituted with a substituent selected from the class consisting of lower-alkyl and lower-alkyloxy and $R^7$ is lower-alkyl, and X is selected from the group consisting of hydrogen, halogen, lower-alkyl, lower-alkyloxy and trihalomethyl.

13. A compound of the general formula:

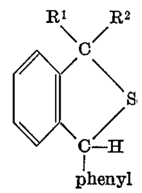

wherein $R^1$ and $R^2$ each is a lower-alkyl group.

14. 1-phenyl-3,3-dimethyl-thiophthalane.

References Cited

UNITED STATES PATENTS 3,438,995 4/1969 Foust, et al. ........ 260—309.6

OTHER REFERENCES

Roberts, et al.: Basic Principles of Org. Chem. (Benjamin, New York, 1964), pp. 345–6, 353, 455, 531, 661, 751, 755.

Smith: The Chem. of Open, Chain Org. N-Cpds. (Benjamin, New York, 1965), vol. I, p. 264.

HENRY R. TILES, Primary Examiner

C. M. SHURKO, Assistant Examiner

U.S. Cl. X.R.

260—247.1, 268, 293.4, 326.3, 326.5, 326.82, 473, 476, 515, 521, 558, 559, 590, 592, 612, 618, 649, 999; 424—246, 248, 250, 267, 274, 275

UNITED STATES PATENT OFFICE
CERTIFICATE OF CORRECTION

Patent No. 3,549,656 Dated December 22, 1970

Inventor(s) POVL VIGGO PETERSEN, NIELS LASSEN, and THORKIL AMMITZBOLL Page - 1

It is certified that error appears in the above-identified patent and that said Letters Patent are hereby corrected as shown below:

Col. 2, line 49
Appl. page 4, line 19 "is" should read -- if --

Col. 3, line 25
Appl. page 6, line 2 "beter" should read -- better -

Col. 3, line 64
Appl. page 7, line 1

Formula: should appear:

" 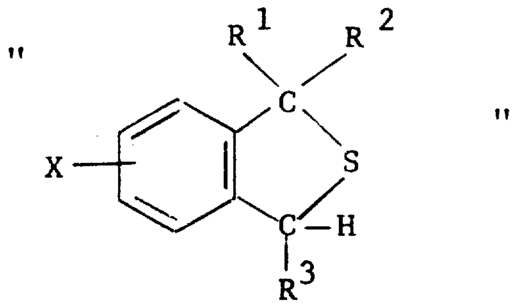 " -- 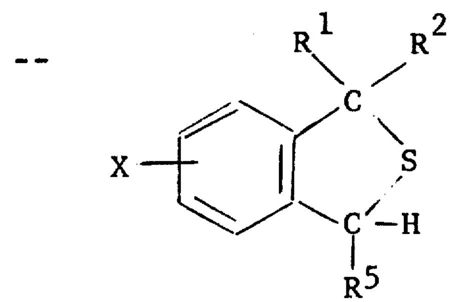

Col. 4, line 5
Appl. page 8, line 1

" X- → " -- $\xrightarrow{H_2S}$ X- --

UNITED STATES PATENT OFFICE
CERTIFICATE OF CORRECTION

Patent No. 3,549,656 Dated December 22, 1970

Inventor(s) POVL VIGGO PETERSEN, NIELS LASSEN, and THORKIL AMMITZBOLL page-2

It is certified that error appears in the above-identified patent and that said Letters Patent are hereby corrected as shown below:

Col. 5, line 75 "either" should read
Appl. page 12, line 29 -- ether --

Col. 6, bridging lines 42 and 43 "methylmagnesum" should re
Appl. p. 14, bridging lines 6 and 7 -- methylmagnesium Col. 7, bridging lines 10 and 11 "thiophthalene" should rea
Appl. page 15, line 18 -- thiophthalane --

Col. 7, line 16 "its its" should read
Appl. page 15, line 23 -- its --

Col. 7, line 33 "the phase" should read
Appl. page 16, lines 7-8 -- the ether phase Col. 8, bridging lines 32 and 33 "eaxple" should read
Appl. page 18, line 11 -- example --

Col. 8, line 41 "3-" should read
Page 18, line 17 -- 3,3- --

Col. 8, line 60 "semicolon (;)" should be
Appl. page 19, line 4 -- comma (,) --

Col. 9, line 19 "either" should read
Appl. page 20, line 6 -- ether --

Col. 10, bridging lines 41 and 42 "spspension" should read
Appl. p. 22, bridging lines 29 & 30 -- suspension --

Col. 10, lines 59 and 62 (2 occurrences) "-thiophthalene" should read
Appl. page 23, lines 13 and 16 (2 occurrences) -- -thiophthalane -

UNITED STATES PATENT OFFICE
CERTIFICATE OF CORRECTION

Patent No. 3,549,656 Dated December 22, 1970

Inventor(s) POVL VIGGO PETERSEN, NIELS LASSEN, and THORKIL AMMITZBOLL page - 3

It is certified that error appears in the above-identified patent and that said Letters Patent are hereby corrected as shown below:

Col. 10, line 70
Appl. page 23, line 22 "thiophthalene" should read -- thiophthalane --

Col. 11, line 2
Appl. page 23, line 28 "thiophthalene" should read -- thiophthalane --

Col. 11, line 15
Appl. page 24, line 9 "thiophthalene" should read -- thiophthalane --

Col. 11, line 17
Appl. page 24, line 11 "thiophthalene" should read -- thiophthalane --

Col. 11, line 32
Appl. page 24, line 23 "thiophthalene" should read -- thiophthalane --

Col. 11, line 69
Appl. page 25, line 22 "thiophthalene" should read -- thiophthalane --

Col. 11, line 56
Appl. page 25, line 11 "-2,6-" should read -- -(2,6- --

Col. 12, line 9
Appl. page 26, line 6 ", and consisted" should read -- , consisted --

Col. 12, line 10
Appl. page 26, line 7 "1-(3-dimethylaminopropyl-1-" sh read -- 1-(3-dimethylaminopropy Col. 13, line 36
Appl. page 28, line 24 "thiophthalene" should read -- thiophthalane --

Col. 14, line 2
Appl. page 29, line 30 "perpared" should read -- prepared --

UNITED STATES PATENT OFFICE
CERTIFICATE OF CORRECTION

Patent No. 3,549,656 Dated December 22, 1970

Inventor(s) POVL VIGGO PETERSEN, NIELS LASSEN, and THORKIL AMMITZBOLL page - 4

It is certified that error appears in the above-identified patent and that said Letters Patent are hereby corrected as shown below:

Col. 15, line 66
Appl. page 33, line 27 — "gluonic" should read -- gluconic --

Col. 15, line 69
Appl. page 33, line 30 — "aid" should read -- acid --

Col. 16, line 1
Appl. page 34, line 4 — "of" should read -- or --

Col. 16, line 5
Appl. page 34, line 8 — "described" should be followed b[y] comma (,) -- described, --

Col. 16, Claim 1, line 36
Amendment Under Rule 111, dated January 22, 1970
Claim -1(Amended)- line 10 — "morpholine" should be followed [by] comma (,) -- morpholine, --

Signed and sealed this 24th day of August 1971.

(SEAL)
Attest:

EDWARD M.FLETCHER,JR.
Attesting Officer

WILLIAM E. SCHUYLER, JR.
Commissioner of Patents